(12) United States Patent
Hill et al.

(10) Patent No.: US 11,053,433 B2
(45) Date of Patent: Jul. 6, 2021

(54) METHODS AND COMPOSITIONS FOR STIMULATING THE PRODUCTION OF HYDROCARBONS FROM SUBTERRANEAN FORMATIONS

(71) Applicant: Flotek Chemistry, LLC, Houston, TX (US)

(72) Inventors: Randal M. Hill, The Woodlands, TX (US); Paul Ashcraft, Cypress, TX (US); Angus Fursdon-Welsh, Spring, TX (US); Lakia M. Champagne, The Woodlands, TX (US); Natalie Forbes, Houston, TX (US)

(73) Assignee: Flotek Chemistry, LLC, Houston, TX (US)

( * ) Notice: Subject to any disclaimer, the term of this patent is extended or adjusted under 35 U.S.C. 154(b) by 0 days.

(21) Appl. No.: 16/206,304

(22) Filed: Nov. 30, 2018

(65) Prior Publication Data
US 2019/0169492 A1   Jun. 6, 2019

Related U.S. Application Data

(60) Provisional application No. 62/593,680, filed on Dec. 1, 2017.

(51) Int. Cl.
*C09K 8/86* (2006.01)
*C09K 8/60* (2006.01)

(52) U.S. Cl.
CPC ............... *C09K 8/86* (2013.01); *C09K 8/602* (2013.01)

(58) Field of Classification Search
None
See application file for complete search history.

(56) References Cited

U.S. PATENT DOCUMENTS

| | | |
|---|---|---|
| 3,047,062 A | 7/1962 | Meadors |
| 3,060,210 A | 10/1962 | De Groote |
| 3,254,714 A | 6/1966 | Gogarty et al. |
| 3,347,789 A | 10/1967 | Dickson et al. |
| 3,356,138 A | 12/1967 | Davis, Jr. et al. |
| 3,368,624 A | 2/1968 | Heuer et al. |
| 3,477,511 A | 11/1969 | Jones et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |

(Continued)

FOREIGN PATENT DOCUMENTS

| | | |
|---|---|---|
| CN | 102127414 A | 7/2011 |
| CN | 102277143 B | 3/2013 |

(Continued)

OTHER PUBLICATIONS

International Search Report and Written Opinion for PCT/US18/63371 dated Feb. 5, 2019.

(Continued)

*Primary Examiner* — John J Figueroa
(74) *Attorney, Agent, or Firm* — Wolf, Greenfield & Sacks, P.C.

(57) ABSTRACT

Emulsion or microemulsion for treating an oil or gas well having a wellbore are provided, and related methods. In some embodiments, the emulsion or microemulsion comprises an aqueous phase; a surfactant; and a non-aqueous phase comprising a first type of solvent and a second type of solvent. In some embodiments, the first type of solvent is a long chain hydrocarbon. In some embodiments, the second type of solvent is an oxygenated solvent. The emulsion or microemulsion may comprise additional components (e.g., at least one type of co-solvent).

23 Claims, No Drawings

(56) References Cited

U.S. PATENT DOCUMENTS

| | | | |
|---|---|---|---|
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 * | 2/2011 | Kakadjian ............ B01F 17/0085 166/270.1 |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,068,108 B2 | 6/2015 | Hill et al. |
| 9,102,860 B2 | 8/2015 | Cawiezel et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood et al. |
| 9,951,264 B2 | 4/2018 | Penny et al. |
| 9,957,779 B2 | 5/2018 | Fursdon-Welsh et al. |
| 9,994,762 B2 | 6/2018 | Hill et al. |
| 10,000,693 B2 | 6/2018 | Hill et al. |
| 10,005,948 B2 | 6/2018 | Champagne et al. |
| 10,053,619 B2 | 8/2018 | Saboowala et al. |
| 10,081,760 B2 | 9/2018 | Ngantung et al. |
| 10,087,361 B2 | 10/2018 | Hill et al. |
| 10,144,862 B2 | 12/2018 | Zelenev et al. |
| 10,196,557 B2 | 2/2019 | Hill et al. |
| 10,280,360 B2 | 5/2019 | Champagne et al. |
| 10,287,483 B2 | 5/2019 | Saboowala et al. |
| 10,294,757 B2 | 5/2019 | Fursdon-Welsh et al. |
| 10,294,764 B2 | 5/2019 | Champagne et al. |

(56) References Cited

U.S. PATENT DOCUMENTS

| | | |
|---|---|---|
| 10,308,859 B2 | 6/2019 | Champagne et al. |
| 10,421,707 B2 | 9/2019 | Trabelsi et al. |
| 10,544,355 B2 | 1/2020 | Hill et al. |
| 10,577,531 B2 | 3/2020 | Pursley et al. |
| 10,590,332 B2 | 3/2020 | Penny et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1 | 9/2003 | Pursley et al. |
| 2003/0232095 A1 | 12/2003 | Garti et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262274 A1 | 9/2014 | Dismuke et al. |
| 2014/0262288 A1 | 9/2014 | Penny et al. |
| 2014/0274822 A1 | 9/2014 | Dismuke et al. |
| 2014/0284053 A1 | 9/2014 | Germack |
| 2014/0332212 A1 | 11/2014 | Ayers et al. |
| 2014/0367107 A1* | 12/2014 | Hill .......................... C09K 8/72 166/305.1 |
| 2014/0371115 A1 | 12/2014 | Hill et al. |
| 2015/0053404 A1 | 2/2015 | Penny et al. |
| 2015/0068751 A1 | 3/2015 | Saboowala et al. |
| 2015/0068755 A1* | 3/2015 | Hill .......................... C09K 8/602 166/308.2 |
| 2015/0105302 A1 | 4/2015 | Pursley et al. |
| 2015/0197683 A1 | 7/2015 | Hategan et al. |
| 2015/0247082 A1 | 9/2015 | Rea |
| 2015/0247381 A1 | 9/2015 | Pursley |
| 2016/0003018 A1* | 1/2016 | Saboowala .............. C09K 8/68 166/298 |
| 2016/0017204 A1 | 1/2016 | Hill et al. |
| 2016/0024890 A1 | 1/2016 | Fursdon-Welsh et al. |
| 2016/0032172 A1 | 2/2016 | Pursley et al. |
| 2016/0075934 A1 | 3/2016 | Champagne et al. |
| 2016/0096989 A1 | 4/2016 | Ngantung et al. |
| 2016/0194550 A1 | 7/2016 | Hill et al. |
| 2016/0257911 A1 | 9/2016 | Denison et al. |
| 2016/0312106 A1 | 10/2016 | Penny et al. |
| 2017/0275518 A1 | 9/2017 | Trabelsi et al. |
| 2017/0313925 A1 | 11/2017 | Dismuke et al. |
| 2017/0335179 A1 | 11/2017 | Ngantung et al. |
| 2017/0368560 A1 | 12/2017 | McElhany et al. |
| 2018/0037792 A1 | 2/2018 | Champagne et al. |
| 2018/0134941 A1 | 5/2018 | Saboowala et al. |
| 2018/0171213 A1 | 6/2018 | Hill et al. |
| 2018/0282611 A1 | 10/2018 | Hill et al. |
| 2018/0305601 A1 | 10/2018 | Champagne et al. |
| 2018/0320060 A1* | 11/2018 | Holtsclaw .............. E21B 43/26 |
| 2019/0031948 A1 | 1/2019 | Hill et al. |
| 2019/0055457 A1 | 2/2019 | Smith, Jr. et al. |
| 2019/0055458 A1 | 2/2019 | Smith, Jr. et al. |
| 2019/0055459 A1 | 2/2019 | Zelenev et al. |
| 2019/0085236 A1 | 3/2019 | Saboowala et al. |
| 2019/0090476 A1 | 3/2019 | Smith, Jr. et al. |
| 2019/0100689 A1 | 4/2019 | Zelenev et al. |
| 2019/0169488 A1 | 6/2019 | Hill et al. |
| 2019/0241796 A1 | 8/2019 | Mast et al. |
| 2019/0264094 A1 | 8/2019 | Hill et al. |
| 2019/0284467 A1 | 9/2019 | Forbes et al. |
| 2019/0315674 A1 | 10/2019 | Trabelsi et al. |
| 2019/0316021 A1 | 10/2019 | Champagne et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| GB | 1105975 A | 3/1968 |
| GB | 1177134 A | 1/1970 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |
| WO | WO 2017/099709 A1 | 6/2017 |
| WO | WO 2018/111229 A1 | 6/2018 |

OTHER PUBLICATIONS

[No Author Listed], The HLB system: a time-saving guide to emulsifier selection. ICI Americas Inc. 1976. 22 pages.

(56) References Cited

OTHER PUBLICATIONS

ADM, Evolution Chemicals E5789-117 Description. Jun. 2014. 1 page.

Brost et al., Surfactants assist water-in-oil monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, Eastern Green River, Wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

\* cited by examiner

METHODS AND COMPOSITIONS FOR STIMULATING THE PRODUCTION OF HYDROCARBONS FROM SUBTERRANEAN FORMATIONS

RELATED APPLICATIONS

This application claims priority to U.S. Provisional Patent Application Ser. No. 62/593,680, filed on Dec. 1, 2017, which is incorporated herein by reference in its entirety.

FIELD OF INVENTION

The present invention generally provides methods and compositions for stimulating the production of hydrocarbons (e.g., formation crude oil and/or formation gas) from subterranean formations.

BACKGROUND OF INVENTION

Emulsions and/or microemulsions are commonly employed in a variety of operations related to the extraction of hydrocarbons, such as well stimulation. Subterranean formations are often stimulated to improve recovery of hydrocarbons. Common stimulation techniques include hydraulic fracturing. Hydraulic fracturing consists of the high pressure injection of a fluid containing suspended proppant into the wellbore in order to create fractures in the rock formation and facilitate production from low permeability zones. All chemicals pumped downhole in an oil and/or gas well can filter through the reservoir rock and block pore throats with the possibility of creating formation damage. It is well known that fluid invasion can significantly reduce hydrocarbon production from a well. In order to reduce fluid invasion, emulsions or microemulsions are generally added to the well-treatment fluids to help unload the residual aqueous treatment from the formation.

Accordingly, although a number of emulsions or microemulsions are known in the art, there is a continued need for more effective emulsions or microemulsions for use in treatment of an oil and/or gas well.

SUMMARY OF INVENTION

Generally, compositions for use in various aspects of the life cycle of an oil and/or gas well, and related methods, are provided.

In some embodiments, microemulsions for treating an oil or gas well having a wellbore are provided comprising a surfactant; an aqueous phase; and a non-aqueous phase comprising a first type of solvent and a second type of solvent, wherein the first type of solvent is a long chain hydrocarbon solvent, and the second type of solvent is an oxygenated solvent.

In some embodiments, methods of treating an oil or gas well having a wellbore are provided comprising injecting an emulsion or microemulsion into the wellbore of the oil or gas well to stimulate the production of hydrocarbons, wherein the emulsion or microemulsion comprises a surfactant, an aqueous phase, and a non-aqueous phase comprising a first type of solvent and a second type of solvent, wherein the first type of solvent is a long chain hydrocarbon solvent, and the second type of solvent is an oxygenated solvent.

Other aspects, embodiments, and features of the methods and compositions will become apparent from the following detailed description when considered in conjunction with the accompanying drawings. All patent applications and patents incorporated herein by reference are incorporated by reference in their entirety. In case of conflict, the present specification, including definitions, will control.

DETAILED DESCRIPTION

Compositions for use in various aspects of the life cycle of an oil and/or gas well, and related methods, are provided. In some embodiments, the composition is provided as an emulsion or a microemulsion, wherein the emulsion or microemulsion comprises an aqueous phase, a surfactant, and a non-aqueous phase. In some embodiments, the non-aqueous phase comprises a plurality of types of solvents. In some embodiments, the compositions are used in methods relating to treating an oil and/or gas well having a wellbore.

In some embodiments, the emulsion or microemulsion comprises at least two types of solvents (e.g., a first type of solvent and a second type of solvent). In some embodiments, the first type of solvent is a long chain hydrocarbon solvent. In some embodiments, the second type of solvent is an oxygenated solvent. Without wishing to be bound by theory, the inventors unexpectedly discovered that the ratio of the first type of solvent to the second type of solvent may affect the ability to form a stable emulsion or microemulsion with the selected solvents. For example, in embodiments wherein only the first type of solvent or only the second type of solvent is present in a composition, a stable emulsion or microemulsion may not form, whereas a stable emulsion or microemulsion can form under essentially the same conditions (e.g., temperature, pressure) wherein both the first type of solvent and the second type of solvent are present in a selected ratio (e.g., at the same total weight percent). For example, see Example 1 wherein a stable microemulsion does not form when only the aliphatic mineral spirit is present in the composition, but does form when isooctanol is included in specific ratios. In some embodiments, the first type of solvent (e.g., long chain hydrocarbon solvent) and the second type of solvent (e.g., oxygenated solvent) may be provided in a ratio between about 11:4 to about 1:1, or between about 5:1 to about 1:5, or between about 4:1 to about 1:1, or between about 6:1 to about 1:1, by weight of the first type of solvent to the second type of solvent.

In some embodiments, the emulsions or microemulsions described herein are stable over a wide range of temperatures. In some embodiments, the emulsion or microemulsion is stable at temperatures greater than about −25° C., or greater than about −20° C., or greater than about −15° C., or greater than about −10° C., or greater than about −5 ° C., or greater than about 0° C. In some embodiments, the emulsion or microemulsion is stable at temperatures up to about 25° C., or up to about 30° C., or up to about 40° C., or up to about 50° C., or up to about 55° C., or up to about 60° C., or up to about 70° C. Combinations of these above mentioned ranges are possible, for example, the microemulsion is stable for temperatures between about −10° C. and about 55° C. Those of ordinary skill in the art will be aware of methods for determining the stability of an emulsion or microemulsion over a range of temperatures, for example mixing a sample of surfactant, solvent, and water in a container (e.g., having a volume between 10 and 50 milliliters), applying a low amount of shear (e.g., by hand with a gentle rocking motion back and forth), and placing the sealed glass jar at a fixed temperature (e.g., in a cold bath or oven at a fixed temperature depending upon whether low temperature or high temperature stability are preferentially investigated, respectively). Samples can be observed over time (e.g., once an hour) to determine visually if the microemulsion is becoming destabilized, for example, as indicate by the formation of a hazy coacervate, precipitate, or flocculation within the sample jar.

Without wishing to be bound by theory, the emulsions and microemulsions described herein may provide a combination of desired features for use in oil and/or gas well application. For example, the presence of one or more long chain hydrocarbon solvents may provide a solvency that is not observed when using shorter chain hydrocarbon solvents. Furthermore, the emulsions or microemulsions described herein may provide an increased surface activity as compared to similar emulsions or microemulsions not including the described combination of solvents.

Additional details regarding the emulsions or microemulsions, as well as the components of the emulsions and microemulsions and applications of the emulsions or microemulsions, are described herein. The terms emulsions and microemulsions should be understood to include emulsions or microemulsions that have a water continuous phase, or that have an oil continuous phase, or microemulsions that are bicontinuous or multiple continuous phases of water and oil. In some embodiments, the emulsion or microemulsion has a water continuous phase. It should be understand that while many of the embodiments described herein refer to microemulsions, this is by no means limiting, and emulsions may also be encompassed.

The emulsion or microemulsion generally comprises a non-aqueous phase. In some embodiments, the non-aqueous phase comprises a solvent blend, comprising at least two types of solvents. For example, the solvent blend may comprise a first type of solvent and a second type of solvent. As described herein, in some embodiments, the first type of solvent is a long chain hydrocarbon solvent and/or the second type of solvent is an oxygenated solvent.

In some embodiments, the emulsion or microemulsion comprises from about 1 wt % to about 30 wt %, or from about 2 wt % to about 25 wt %, or from about 5 wt % to about 25 wt %, or from about 15 wt % to about 25 wt %, or from about 3 wt % to about 40 wt %, or from about 5 wt % to about 30 wt %, or from about 7 wt % to about 22 wt % of the total amount of the one or more types of solvent, versus the total weight of the emulsion or microemulsion composition.

In some embodiments, each solvent type may comprise more than one solvent of that type. For example, the first type of solvent may include a single long chain hydrocarbon solvent or a plurality of types of long chain hydrocarbon solvents. As another non-limiting example, the second type of solvent may include a single oxygenated solvent or a plurality of types of oxygenated solvents. In some embodiments, a solvent is a liquid that dissolves other substances, for example, residues or other substances found at or in a wellbore (e.g. kerogens, asphaltenes, paraffins, organic scale).

Long-Chain Hydrocarbon Solvents

In some embodiments, the first type of solvent is a long chain hydrocarbon solvent or comprises a plurality of types of long chain hydrocarbon solvents. The term hydrocarbon solvent encompasses unsubstituted cyclic or acyclic, branched or unbranched, saturated or unsaturated, hydrocarbon compounds (e.g., alkanes, alkenes) The term long chain encompasses solvent having a high number of carbon atoms, for example, 12-22, or 12-20, or 12-18, or 14-24, or 14-22, or 14-20, or 13-23, or 11-14, carbon atoms, inclusive.

In some embodiments, the first type of solvent is or comprises a mixture of $C_{12-22}$ hydrocarbon solvents, or a mixture of $C_{12-20}$ hydrocarbon solvents, or a mixture of $C_{12-18}$ hydrocarbon solvents, or a mixture of $C_{14-24}$ hydrocarbon solvents, or a mixture of $C_{14-22}$ hydrocarbon solvents, or a mixture of $C_{14-20}$ hydrocarbon solvents, or a mixture of $C_{13-23}$ hydrocarbon solvents, or a mixture of $C_{11-14}$ hydrocarbon solvents. In some embodiments, the hydrocarbon solvents are unsubstituted cyclic or acyclic, branched or unbranched alkanes. In some embodiments, the hydrocarbon solvents are unsubstituted cyclic or acyclic, branched or unbranched alkenes. In some embodiments, the hydrocarbon solvents include a combination of unsubstituted cyclic or acyclic, branched or unbranched alkanes and unsubstituted cyclic or acyclic, branched or unbranched alkenes.

In some embodiments, the first type of solvent is an aliphatic mineral spirit, which is given its ordinary meaning in the art and refers to a solvent comprising a plurality of types of long chain hydrocarbon solvents, generally alkanes. The aliphatic mineral spirit may be purchased from a commercial source. Non-limiting examples of aliphatic mineral spirits that may be purchased include EFC Crystal 210 solvent (available from Total), Shellsol D80 (available from Shell®), and Exxsol™ D80 (available from Exxon Mobil®). In some embodiments, the aliphatic mineral spirit has a high boiling point (e.g., greater than about 150° C., or greater than about 180° C., or greater than about 200° C.) and/or a low vapor pressure (e.g., less than about 1 kPa). As will be known to those of ordinary skill in the art, aliphatic mineral spirits may comprise a small amount of impurities (e.g., aromatic compounds) due to the manner in which they are prepared (e.g., hydrogenation of petroleum fractions). In some embodiments, the aliphatic mineral spirit comprises less than about 2%, or less than about 1%, or less than about 0.5%, or less than about 0.1%, or less than about 0.05%, impurities (e.g., aromatic compounds).

In some embodiments, the first type of solvent is a long chain alpha-olefin solvent or comprises a mixture of long chain alpha-olefin solvents. Alpha-olefins (or α-olefins) are a family of organic compounds which are alkenes (also known as olefins) with a chemical formula $C_xH_{2x}$, distinguished by having a double bond at the primary or alpha (α) position. In some embodiments, x is 12-22, or 12-20, or 12-18, or 14-24, or 14-22, or 14-20, or 13-23, or 11-14. In some embodiments, the first type of solvent is a $C_{12-18}$ alpha-olefin solvent or comprises more than one type of $C_{12-18}$ alpha-olefin solvents. Non-limiting examples of $C_{12-18}$ alpha-olefin solvents include 1-dodecene, 2-methyl-1-undecene, 1-tridecene, 2-methyl-1-dodecene, 1-tetradecene, 2-methyl-1-tridecene, 1-pentadecene, 2-methyl-1-tetradecene, 1-hexadecene, 2-methyl-1-pentadecene, 1-heptadecene, 2-methyl-1-hexadecene, 1-octadecene, and 2-methyl-1-heptadecene.

In some embodiments, the first type of solvent (e.g., long chain hydrocarbon solvent) is present in an amount from about 1 wt % to about 25 wt %, or about 1 wt % to about 20 wt %, or from about 1 wt % to about 15 wt %, or from about 1 wt % to about 10 wt %, or from about 1 wt % and about 5 wt %, or from about 1 wt % and about 3 wt %, versus the total microemulsion.

Oxygenated Solvents

In some embodiments, the second type of solvent comprises an oxygenated solvent. As used herein, the term oxygenated solvent is given its ordinary meaning in the art and refers to solvents comprising one or more oxygen atoms in their molecular structure in addition to carbon atoms and hydrogen (e.g., an oxygenated hydrocarbon solvent). For example, the solvent may comprise one or more of an alcohol, an aldehyde, a ketone, an ester, or an ether. In some embodiments, the oxygenated solvent comprises a plurality of types of oxygenated solvents having 6-22 carbon atoms, or 6-18 carbon atoms, or 8-18 carbon atoms, or 12-18 carbon atoms. Non-limiting examples of oxygenated solvents include oxygenated terpenes, alcohols, ketones, aldehydes, and esters.

In some embodiments, the ketone is a ketone having 12-18 carbon atoms. In some embodiments, the aldehyde is an aldehyde having 12-18 carbon atoms. In some embodiments, the ester is an ester having 6-22 carbon atoms. In some embodiments, the ester is a methyl ester having 6-22 carbon atoms. In some embodiments, the ester is an alkyl aliphatic carboxylic acid ester.

In some embodiments, the second type of solvent is an alcohol. For example, the alcohol may be a cyclic or acyclic, branched or unbranched alkane having 6 to 12 carbon atoms and substituted with a hydroxyl group (e.g., an alcohol). Non-limiting examples of cyclic or acyclic, branched or unbranched alkanes having 6 to 12 carbon atoms and substituted with a hydroxyl group include isomers of heptanol, isomers of octanol, isomers of nonanol, isomers of decanol, isomers of undecanol, isomers of dodecanol, and combinations thereof.

Non-limiting examples of alcohols include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, isomers of trimethylpentanol, and combinations thereof. In a particular embodiment, the cyclic or acyclic, branched or unbranched alkane has 8 carbon atoms and is substituted with a hydroxyl group. In a particular embodiment, the oxygenated solvent is isooctanol.

Non-limiting examples of oxygenated terpenes include terpenes containing alcohol, aldehyde, ether, or ketone groups. In some embodiments, the terpene comprises an ether-oxygen, for example, eucalyptol, or a carbonyl oxygen, for example, menthone. In some embodiments, the terpene is a terpene alcohol. Non-limiting examples of terpene alcohols include linalool, geraniol, nopol, α-terpineol, and menthol. Non-limiting examples of oxygenated terpenes include eucalyptol, 1,8-cineol, menthone, and carvone.

As used herein, "alkyl aliphatic carboxylic acid ester" refers to a compound or a blend of compounds having the general formula:

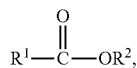

wherein $R^1$ is an optionally substituted aliphatic group, including those bearing heteroatom-containing substituent groups, and $R^2$ is a $C_1$ to $C_6$ alkyl group. In some embodiments, $R^1$ is $C_6$ to $C_{22}$ alkyl. In some embodiments, $R^1$ is substituted with at least one heteroatom-containing substituent group. For example, wherein a blend of compounds is provided and each $R^2$ is —$CH_3$ and each $R^1$ is independently a $C_6$ to $C_{22}$ aliphatic group, the blend of compounds is referred to as methyl aliphatic carboxylic acid esters, or methyl esters. In some embodiments, such alkyl aliphatic carboxylic acid esters may be derived from a fully synthetic process or from natural products, and thus comprise a blend of more than one ester. In some embodiments, the alkyl aliphatic carboxylic acid ester comprises butyl 3-hydroxybutyrate, isopropyl 3-hydroxybutyrate, hexyl 3-hydroxylbutyrate, and combinations thereof. Non-limiting examples of alkyl aliphatic carboxylic acid esters include methyl octanoate, methyl decanoate, a blend of methyl octanoate and methyl decanoate, methyl octenoate, methyl decenoate, methyl dodecenoate, methyl tetradodecenoate, and butyl 3-hydroxybutyrate.

In some embodiments, the emulsion or microemulsion may comprise a branched or unbranched dialkylether having the formula $C_nH_{2n+1}OC_mH_{2m+1}$ wherein n+m is from 6 to 16. In some embodiments, n+m is from 6 to 12, or from 6 to 10, or from 6 to 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialklyether is an isomer of $C_6H_{13}OC_6H_{13}$ (e.g., dihexylether).

Other non-limiting examples of oxygenated solvents include 2-(acetoacetoxy)ethyl methacrylate, 2-(hydroxyethyl) methacrylate, 2,2-dimethyl-1,3-propanediol, 1,4-cyclohexanedimethanol, and oxoacids having 3-8 carbon atoms.

In some embodiments, the second type of solvent is present in an amount from about 0.5 wt % to about 25 wt %, or from about 1 wt % to about 20 wt %, or from about 1 wt % to about 15 wt %, or from about 1 wt % to about 10 wt %, or from about 1 wt % and about 5 wt %, or from about 1 wt % and about 3 wt %, versus the total microemulsion.

Other Types of Solvents

In some embodiments, the emulsion or microemulsion may comprise additional types of solvents. Non-limiting examples of such solvents include terpenes, terpineols, terpene alcohols, aldehydes, ketones, esters, amines, and amides.

Terpenes are generally derived biosynthetically from units of isoprene. Terpenes may be generally classified as monoterpenes (e.g., having two isoprene units), sesquiterpenes (e.g., having 3 isoprene units), diterpenes, or the like. The term "terpenoid" includes natural degradation products, such as ionones, and natural and synthetic derivatives, e.g., terpene alcohols, ethers, aldehydes, ketones, acids, esters, epoxides, and hydrogenation products (e.g., see Ullmann's Encyclopedia of Industrial Chemistry, 2012, pages 29-45, herein incorporated by reference). In some embodiments, the terpene is a naturally occurring terpene. In some embodiments, the terpene is a non-naturally occurring terpene and/or a chemically modified terpene (e.g., saturated terpene, terpene amine, fluorinated terpene, or silylated terpene). Terpenes that are modified chemically, such as by oxidation or rearrangement of the carbon skeleton, may be referred to as terpenoids. Many references use "terpene" and "terpenoid" interchangeably, and this disclosure will adhere to that usage.

In some embodiments, the terpene is a non-oxygenated terpene. In some embodiments, the terpene is citrus terpene. In some embodiments, the terpene is d-limonene. In some embodiments, the terpene is dipentene. In some embodiments, the terpene is selected from the group consisting of d-limonene, nopol, alpha terpineol, eucalyptol, dipentene, linalool, alpha-pinene, beta-pinene, alpha-terpinene, geraniol, alpha-terpinyl acetate, menthol, menthone, cineole, citranellol, and combinations thereof. As used herein, "terpene" refers to a single terpene compound or a blend of terpene compounds.

In some embodiments, the emulsion or microemulsion may comprise an unsubstituted cyclic or acyclic, branched or unbranched alkane. In some embodiments, the cyclic or acyclic, branched or unbranched alkane has from 6 to 12 carbon atoms. Non-limiting examples of unsubstituted, acyclic, unbranched alkanes include hexane, heptane, octane, nonane, decane, undecane, dodecane, and combinations thereof. Non-limiting examples of unsubstituted, acyclic, branched alkanes include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), isomers of ethylmethylpentane (e.g., 3-ethyl-2-methylpentane, 3-ethyl-3-methylpentane), and combinations thereof. Non-limiting examples of unsubstituted cyclic branched or unbranched alkanes include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, cyclodecane, and combinations thereof. In some embodiments, the unsubstituted cyclic or acyclic, branched or unbranched alkane having from 6 to 12 carbon atoms is selected from the group consisting of heptane, octane, nonane, decane, 2,2,4-trimethylpentane (isooctane), and propylcyclohexane, and combinations thereof.

In some embodiments, the emulsion or microemulsion may comprise unsubstituted acyclic branched alkene or unsubstituted acyclic unbranched alkene having one or two double bonds and from 6 to 12 carbon atoms, or an unsubstituted acyclic branched alkene or unsubstituted acyclic unbranched alkene having one or two double bonds and from 6 to 10 carbon atoms. Non-limiting examples of unsubstituted acyclic unbranched alkenes having one or two double bonds and from 6 to 12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, isomers of dodecadiene, and combinations thereof. In some embodiments, the acyclic, unbranched alkene having one or two double bonds and from 6 to 12 carbon atoms is an alpha-olefin (e.g., 1-hexene, 1-heptene, 1-octene, 1-nonene, 1-decene, 1-undecene, 1-dodecene). Non-limiting examples of unsubstituted, acyclic, branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylhexptene, isomers of methylethylheptene, and combinations thereof.

In some embodiments, the emulsion or microemulsion may comprise an aromatic solvent having a boiling point from about 300 to about 400 degrees Fahrenheit. Non-limiting examples of aromatic solvents having a boiling point from about 300 to about 400 degrees Fahrenheit include butylbenzene, hexylbenzene, mesitylene, light aromatic naphtha, heavy aromatic naphtha, and combinations thereof.

In some embodiments, the emulsion or microemulsion may comprise an aromatic solvent having a boiling point from about 175 to about 300 degrees Fahrenheit. Non-limiting examples of aromatic liquid solvents having a boiling point from about 175 to about 300 degrees Fahrenheit include benzene, xylenes, and toluene.

In some embodiments, the emulsion or microemulsion may comprise an amine of the formula $NR^1R^2R^3$, wherein $R^1$, $R^2$, and $R^3$ are the same or different and are $C_{1-16}$ alkyl groups that are (i) branched or unbranched; (ii) cyclic or acyclic; and (iii) substituted or unsubstituted. In some embodiments any two of $R^1$, $R^2$, and $R^3$ are joined together to form a ring. In some embodiments, each of $R^1$, $R^2$, and $R^3$ are the same or different and are hydrogen or alkyl groups that are (i) branched or unbranched; (ii) cyclic or acyclic; and (iii) substituted or unsubstituted. In some embodiments, any two of $R^1$, $R^2$, and $R^3$ are joined together to form a ring, provided at least one of $R^1$, $R^2$, and $R^3$ is a methyl or an ethyl group. In some embodiments, $R^1$ is $C_1$-$C_6$ alkyl group that is (i) branched or unbranched; (ii) cyclic or acyclic; and (iii) substituted or unsubstituted and $R^2$ and $R^3$ are hydrogen or a $C_{8-16}$ alkyl group that is (i) branched or unbranched; (ii) cyclic or acyclic; and (iii) substituted or unsubstituted. In some embodiments, $R^2$ and $R^3$ may be joined together to form a ring. In some embodiments, $R^1$ is a methyl or an ethyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ is a methyl group and $R^2$ and $R^3$ are the same or different and are hydrogen or $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ and $R^2$ are the same or different and are hydrogen or $C_1$-$C_6$ alkyl groups that are (i) branched or unbranched; (ii) cyclic or acyclic; and (iii) substituted or unsubstituted and $R^3$ is a $C_{8-16}$ alkyl group that is (i) branched or unbranched; (ii) cyclic or acyclic; and (iii) substituted or unsubstituted. In some embodiments, $R^1$ and $R^2$ are the same or different and are a methyl or an ethyl group and $R^3$ is hydrogen or a $C_{8-16}$ alkyl group that is (i) branched or unbranched; (ii) cyclic or acyclic; and (iii) substituted or unsubstituted. In some embodiments, $R^1$ and $R^2$ are methyl groups and $R^3$ is hydrogen or a $C_{8-16}$ alkyl group that is (i) branched or unbranched; (ii) cyclic or acyclic; and (iii) substituted or unsubstituted.

In some embodiments, the amine is of the formula $NR^1R^2R^3$, wherein $R^1$ is methyl and $R^2$ and $R^3$ are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-octylamine, isomers of N-methyl-nonylamine, isomers of N-methyl-decylamine, isomers of N-methylundecylamine, isomers of N-methyldodecylamine, isomers of N-methyl teradecylamine, isomers of N-methyl-hexadecylamine, and combinations thereof. In some embodiments, the amine is N-methyl-decylamine, N-methyl-hexadecylamine, or a combination thereof.

In some embodiments, the amine is of the formula $NR^1R^2R^3$, wherein $R^1$ is a methyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-N-octyloctylamine, isomers of N-methyl-N-nonylnonylamine, isomers of N-methyl-N-decyldecylamine, isomers of N-methyl-N-undecylundecylamine, isomers of N-methyl-N-dodecyldodecylamine, isomers of N-methyl-N-tetradecylteradecylamine, isomers of N-methyl-N-hexadecylhexadecylamine, isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the amine is selected from the group consisting of N-methyl-N-octyloctylamine, isomers of N-methyl-N-nonylnonylamine, isomers of N-methyl N-decyldecylamine, isomers of N-methyl-N-undecylundecylamine, isomers of N-methyl-N-dodecyldodecylamine, isomers of N-methyl-N-tetradecylteradecylamine, and isomers of N-methyl-N-hexadecylhexadecylamine, and combinations thereof. In some embodiments, the amine is N-methyl-N-dodecyldodecylamine, one or more isomers of N-methyl-N-hexadecylhexadecylamine, or combinations thereof. In some embodiments, the amine is selected from the group consisting of isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the cyclic or acyclic, branched or unbranched tri-substituted amine is selected from the group consisting of N-methyl-N-octyldodecylamine, N-methyl-N-octylhexadecylamine, and N-methyl-N-dodecylhexadecylamine, and combinations thereof.

In some embodiments, the amine is of the formula $NR^1R^2R^3$, wherein $R^1$ and $R^2$ are methyl and $R^3$ is a $C_{8-16}$ alkyl that is (i) branched or unbranched; (ii) cyclic or acyclic; and (iii) substituted or unsubstituted. Non-limiting examples of amines include isomers of N,N-dimethylnonylamine, isomers of N,N-dimethyldecylamine, isomers of N,N-dimethylundecylamine, isomers of N,N-dimethyldodecylamine, isomers of N,N-dimethyltetradecylamine, and isomers of N,N-dimethylhexadecylamine. In some embodiments, the amine is selected from the group consisting of N,N-dimethyldecylamine, isomers of N,N-dodecylamine, and isomers of N,N-dimethylhexadecylamine.

In some embodiments, the emulsion or microemulsion may comprise an amide solvent. In some embodiments, the amide is of the formula $N(C=OR^4)R^5R^6$, wherein $R^4$, $R^5$, and $R^6$ are the same or different and are hydrogen or $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, each of $R^4$, $R^5$, and $R^6$ are the same or different and are hydrogen or $C_{4-16}$ alkyl groups wherein the alkyl groups are (i) branched or unbranched; (ii) cyclic or acyclic; and (iii) substituted or unsubstituted, provided at least one of $R^4$, $R^5$, and $R^6$ is a methyl or an ethyl group. In some embodiments $R^5$ and $R^6$ are joined together to form a ring. In some embodiments, $R^4$ is hydrogen, $C_1$-$C_6$ alkyl, wherein the alkyl group is (i) branched or unbranched; (ii) cyclic or acyclic; and (iii) substituted or unsubstituted, and $R^5$ and $R^6$ are the same or different and are hydrogen or $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen, methyl, or ethyl and $R^5$ and $R^6$ are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen and $R^5$ and $R^6$ are the same or different and are $C_{8-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, $R^4$ and $R^5$ are the same or different and are hydrogen or $C_1$-$C_6$ alkyl groups wherein the alkyl groups are (i) branched or unbranched; (ii) cyclic or acyclic; and (iii) substituted or unsubstituted and $R^6$ is a $C_{8-16}$ alkyl group that is (i) branched or unbranched; (ii) cyclic or acyclic; and (iii) substituted or unsubstituted. In some embodiments, $R^4$ and $R^5$ are the same or different and are independently hydrogen, methyl, or ethyl and $R^6$ is a $C_{8-16}$ alkyl group that is (i) branched or unbranched; (ii) cyclic or acyclic; and (iii) substituted or unsubstituted. In some embodiments, $R^4$ and $R^5$ are hydrogen and $R^6$ is a $C_{8-16}$ alkyl group that is (i) branched or unbranched; (ii) cyclic or acyclic; and (iii) substituted or unsubstituted. In some embodiments, $R^6$ is hydrogen or $R^6$ is a $C_{1-6}$ alkyl group that is (i) branched or unbranched; (ii) cyclic or acyclic; and (iii) substituted or unsubstituted and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen, methyl, or ethyl and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are the same or different and are hydrogen or $C_{1-6}$ alkyl groups wherein the alkyl groups are (i) branched or unbranched; (ii) cyclic or acyclic; and (iii) substituted or unsubstituted, and $R^4$ is a $C_{8-16}$ alkyl group that is (i) branched or unbranched; (ii) cyclic or acyclic; and (iii) substituted or unsubstituted. In some embodiments, $R^5$ and $R^6$ are the same or different and are independently hydrogen, methyl, or ethyl and $R^4$ is a $C_{8-16}$ alkyl group that is (i) branched or unbranched; (ii) cyclic or acyclic; and (iii) substituted or unsubstituted. In some embodiments, $R^5$ and $R^6$ are hydrogen and $R^4$ is a $C_{8-16}$ alkyl group that is (i) branched or unbranched; (ii) cyclic or acyclic; and (iii) substituted or unsubstituted.

In some embodiments, the amide is of the formula $N(C=OR^4)R^5R^6$, wherein each of $R^4$, $R^5$, and $R^6$ are the same or different and are $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, the amide is of the formula $N(C=O R^4)R^5R^6$, wherein each of $R^4$, $R^5$, and $R^6$ are the same or different and are $C_{8-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. Non-limiting examples of amides include N,N-dioctyloctamide, N,N-dinonylnonamide, N,N-didecyldecamide, N,N-didodecyldodecamide, N,N-diundecylundecamide, N,N-ditetradecyltetradecamide, N,N-dihexadecylhexadecamide, N,N-didecyloctamide, N,N-didodecyloctamide, N,N-dioctyldodecamide, N,N-didecyldodecamide, N,N-dioctylhexadecamide, N,N-didecylhexadecamide, N,N-didodecylhexadecamide, and combinations thereof. In some embodiments, the amide is N,N-dioctyldodecamide, N,N-didodecyloctamide, or a combination thereof.

In some embodiments, the amide is of the formula $N(C=OR^4)R^5R^6$, wherein $R^6$ is selected from the group consisting of hydrogen, methyl, ethyl, propyl and isopropyl, and $R^4$ and $R^5$ are the same or different and are $C_{4-16}$ alkyl groups wherein the alkyl groups are (i) branched or unbranched; (ii) cyclic or acyclic; and (iii) substituted or unsubstituted. In some embodiments, $R^6$ is selected from the group consisting of hydrogen, methyl, ethyl, propyl and isopropyl, and $R^4$ and $R^5$ are the same or different and are $C_{4-8}$ alkyl groups wherein the alkyl groups are (i) branched or unbranched; (ii) cyclic or acyclic; and (iii) substituted or unsubstituted. In some embodiments, at least one of $R^4$ and $R^5$ is substituted with a hydroxyl group. In some embodiments, at least one of $R^4$ and $R^5$ is $C_{1-16}$ alkyl substituted with a hydroxyl group.

In some embodiments, the amide is of the formula $N(C=OR^4)R^5R^6$, wherein $R^6$ is $C_1$-$C_3$ alkyl and $R^4$ and $R^5$ are the same or different and are $C_{4-16}$ alkyl groups that are (i) branched or unbranched; (ii) cyclic or acyclic; and (iii) substituted or unsubstituted. In some embodiments, $R^6$ is selected from the group consisting of methyl, ethyl, propyl, and isopropyl, and $R^4$ and $R^5$ are the same or different and are $C_{4-16}$ alkyl groups that are (i) branched or unbranched; (ii) cyclic or acyclic; and (iii) substituted or unsubstituted. In some embodiments, $R^6$ is selected from the group consisting of methyl, ethyl, propyl, and isopropyl, and $R^4$ and $R^5$ are the same or different and are $C_{8-16}$ alkyl groups that are (i) branched or unbranched; (ii) cyclic or acyclic; and (iii) substituted or unsubstituted. In some embodiments, at least one of $R^4$ and $R^5$ is substituted with a hydroxyl group. In some embodiments, $R^6$ is selected from the group consisting of methyl, ethyl, propyl, and isopropyl, and $R^4$ and $R^5$ are the same or different and are $C_{4-16}$ alkyl groups that are (i) branched or unbranched; (ii) cyclic or acyclic; and (iii) substituted or unsubstituted. In some embodiments at least one of $R^4$ and $R^5$ is $C_{1-16}$ alkyl substituted with a hydroxyl group.

Non-limiting examples of amides include N,N-di-tert-butylformamide, N,N-dipentylformamide, N,N-dihexylformamide, N,N-diheptylformamide, N,N-dioctylformamide, N,N-dinonylformamide, N,N-didecylformamide, N,N-diundecylformamide, N,N-didodecylformamide, N,N-dihydroxymethylformamide, N,N-di-tert-butylacetamide, N,N-dipentylacetamide, N,N-dihexylacetamide, N,N-diheptylacetamide, N,N-dioctylacetamide, N,N-dinonylacetamide, N,N-didecylacetamide, N,N-diundecylacetamide, N,N-didodecylacetamide, N,N-dihydroxymethylacetamide, N,N-dimethylpropionamide, N,N-diethylpropionamide, N,N-dipropylpropionamide, N,N-di-n-propylpropionamide N,N-diisopropylpropionamide, N,N-dibutylpropionamide, N,N-di-n-butylpropionamide, N,N-di-sec-butylpropionamide, N,N-diisobutylpropionamide or N,N-di-tert-butylpropionamide, N,N-dipentylpropionamide, N,N-dihexylpropionamide, N,N-diheptylpropionamide, N,N-dioctylpropionamide, N,N-dinonylpropionamide, N,N-didecylpropionamide, N,N-diundecylpropionamide, N,N-didodecylpropionamide, N,N-dimethyl-n-butyramide, N,N-diethyl-n-butyramide, N,N-dipropyl-n-butyramide, N,N-di-n-propyl-n-butyramide or N,N-diisopropyl-n-butyramide, N,N-dibutyl-n-butyramide, N,N-di-n-butyl-n-butyramide, N,N-di-sec-butyl-n-butyramide, N,N-diisobutyl-n-butyramide, N,N-di-tert-butyl-n-butyramide, N,N-dipentyl-n-butyramide, N,N-dihexyl-n-butyramide, N,N-diheptyl-n-butyramide, N,N-dioctyl-n-butyramide, N,N-dinonyl-n-butyramide, N,N-didecyl-n-butyramide, N,N-diundecyl-n-butyramide, N,N-didodecyl-n-butyramide, N,N-dipentylisobutyramide, N,N-dihexylisobutyramide, N,N-diheptylisobutyramide, N,N-dioctylisobutyramide, N,N-dinonylisobutyramide, N,N-didecylisobutyramide, N,N-diundecylisobutyramide, N,N-didodecylisobutyramide, N,N-pentylhexylformamide, N,N-pentylhexylacetamide, N,N-pentylhexylpropionamide, N,N-pentylhexyl-n-butyramide, N,N-pentylhexylisobutyramide, N,N-methylethylpropionamide, N,N-methyl-n-propylpropionamide, N,N-methylisopropylpropionamide, N,N-methyl-n-butylpropionamide, N,N-methylethyl-n-butyramide, N,N-methyl-n-butyramide, N,N-methylisopropyl-n-butyramide, N,N-methyl-n-butyl-n-butyramide, N,N-methylethylisobutyramide, N,N-methyl-n-propylisobutyramide, N,N-methylisopropylisobutyramide, and N,N-methyl-n-butylisobutyramide. In some embodiments, the amide is selected from the group consisting of N,N-dioctyldodecacetamide, N,N-methyl-N-octylhexadecdidodecylacetamide, N-methyl-N-hexadecyldodecylhexadecacetamide, and combinations thereof.

In some embodiments, the amide is of the formula $N(C=OR^4)R^5R^6$, wherein $R^6$ is hydrogen or a methyl group and $R^4$ and $R^5$ are $C_{8-16}$ alkyl groups that are (i) branched or unbranched; (ii) cyclic or acyclic; and (iii) substituted or unsubstituted. Non-limiting amides include isomers of N-methyloctamide, isomers of N-methylnonamide, isomers of N-methyldecamide, isomers of N-methylundecamide, isomers of N methyldodecamide, isomers of N methylteradecamide, and isomers of N-methyl-hexadecamide. In some embodiments, the amides are selected from the group consisting of N-methyloctamide, N-methyldodecamide, N-methylhexadecamide, and combinations thereof.

Non-limiting amides include isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, isomers of N methyl-N-tetradecylhexadecamide, and combinations thereof. In some embodiments, the amide is selected from the group consisting of isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, and combinations thereof. In some embodiments, amide is selected from the group consisting of N-methyl-N-octyloctamide, N methyl-N-dodecyldodecamide, and N-methyl-N-hexadecylhexadecamide. In some embodiments, the amide is selected from the group consisting of isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In some embodiments, the amide is selected from the group consisting of N-methyl-N-octyldodecamide, N-methyl-N-octylhexadecamide, and N-methyl-N-dodecylhexadecamide.

In some embodiments, the amide is of the formula $N(C=OR^4)R^5R^6$, wherein $R^5$ and $R^6$ are the same or different and are hydrogen or $C_1$-$C_3$ alkyl groups and $R^4$ is a $C_{4-16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl, and $R^4$ is a $C_{4-16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl and $R^4$ is a $C_{8-16}$ alkyl group that is (i) branched or unbranched; (ii) cyclic or acyclic; and (iii) substituted or unsubstituted. In some embodiments, $R^4$ is substituted with a hydroxyl group. In some embodiments, $R^5$ and $R^6$ are the same or different and are selected from the group consisting of hydrogen, methyl, ethyl, propyl, and isopropyl, and $R^4$ is selected from the group consisting of tert-butyl and $C_{5-16}$ alkyl groups that are (i) branched or unbranched; (ii) cyclic or acyclic; and (iii) substituted or unsubstituted, and $C_{1-16}$ alkyl groups that are (i) branched or unbranched; (ii) cyclic or acyclic; and (iii) substituted with a hydroxyl group.

In some embodiments, the amide is of the formula $N(C=OR^4)R^5R^6$, wherein $R^5$ and $R^6$ are methyl groups and $R^4$ is a $C_{8-16}$ alkyl group that is (i) branched or unbranched; (ii) cyclic or acyclic; and (iii) substituted or unsubstituted. Non-limiting examples of amides include isomers of N,N-dimethyloctamide, isomers of N,N-dimethylnonamide, isomers of N,N-dimethyldecamide, isomers of N,N-dimethylundecamide, isomers of N,N-dimethyldodecamide, isomers of N,N-dimethyltetradecamide, isomers of N,N-dimethylhexadecamide, and combinations thereof. In some embodiments, the cyclic or acyclic, branched or unbranched trisubstituted amines is selected from the group consisting of N,N-dimethyloctamide, N,N-dodecamide, and N,N-dimethylhexadecamide.

In some embodiments, a solvent (e.g., a terpene) may be extracted from a natural source (e.g., citrus, pine), and may comprise one or more impurities present from the extraction process. In some embodiments, the solvent comprises a crude cut (e.g., uncut crude oil, e.g., made by settling, separation, heating, etc.). In some embodiments, the solvent is a crude oil (e.g., naturally occurring crude oil, uncut crude oil, crude oil extracted from the wellbore, synthetic crude oil, crude citrus oil, crude pine oil, eucalyptus, etc.). In some embodiments, the solvent comprises a citrus extract (e.g., crude orange oil, orange oil, etc.). In some embodiments, the solvent is a citrus extract (e.g., crude orange oil, orange oil, etc.).

Aqueous Phase

In some embodiments, an emulsion or microemulsion comprises an aqueous phase. Generally, the aqueous phase comprises water. The water may be provided from any suitable source (e.g., sea water, fresh water, deionized water, reverse osmosis water, water from field production). In some embodiments, the emulsion or microemulsion comprises from about 1 wt % to about 60 wt %, or from about 10 wt % to about 55 wt %, or from about 15 wt % to about 45 wt %, or from about 25 wt % to about 45 wt % of water, or from about 5 wt % to about 75 wt % versus the total weight of the emulsion or microemulsion composition. In some embodiments, the surfactant and one or more solvents may be provided at select wt % as described herein, and the remainder of the composition may be the aqueous phase (e.g., water). The aqueous phase may comprise dissolved salts. Non-limiting examples of dissolved salts include salts comprising K, Na, Br, Cr, Cs, or Bi, for example, halides of these metals, including NaCl, KCl, $CaCl_2$, $MgCl$, and combinations thereof.

Surfactants

Generally, the emulsion or microemulsion comprises a surfactant. In some embodiments, the emulsion or microemulsion comprises a first surfactant and a second surfactant. In some embodiments the emulsion or microemulsion comprises a first surfactant and a co-surfactant. In some embodiments, the emulsion or microemulsion comprises a first surfactant, a second surfactant and a co-surfactant. The term surfactant is given its ordinary meaning in the art and generally refers to compounds having an amphiphilic structure which gives them a specific affinity for oil/water-type and water/oil-type interfaces. In some embodiments, the affinity helps the surfactants to reduce the free energy of these interfaces and to stabilize the dispersed phase of an emulsion or microemulsion.

The term surfactant includes but is not limited to nonionic surfactants, anionic surfactants, cationic surfactants, amphoteric surfactants, zwitterionic surfactants, switchable surfactants, cleavable surfactants, dimeric or gemini surfactants, glucamide surfactants, alkylpolyglycoside surfactants, extended surfactants containing a nonionic spacer arm central extension and an ionic or nonionic polar group, and combinations thereof. Nonionic surfactants generally do not contain any charges. Anionic surfactants generally possess a net negative charge. Cationic surfactants generally possess a net positive charge. Amphoteric surfactants generally have both positive and negative charges, however, the net charge of the surfactant can be positive, negative, or neutral, depending on the pH of the solution. Zwitterionic surfactants are generally not pH dependent. A zwitterion is a neutral molecule with a positive and a negative electrical charge, though multiple positive and negative charges can be present.

"Extended surfactants" are defined herein to be surfactants having propoxylated/ethoxylated spacer arms. The extended chain surfactants are intramolecular mixtures having at least one hydrophilic portion and at least one lipophilic portion with an intermediate polarity portion in between the hydrophilic portion and the lipophilic portion; the intermediate polarity portion may be referred to as a spacer. They attain high solubilization in the single phase emulsion or microemulsion, and are in some instances, insensitive to temperature and are useful for a wide variety of oil types, such as natural or synthetic polar oil types in a non-limiting embodiment. More information related to extended chain surfactants may be found in U.S. Pat. No. 8,235,120, which is incorporated herein by reference in its entirety.

The term co-surfactant as used herein is given its ordinary meaning in the art and refers to compounds (e.g., pentanol) that act in conjunction with surfactants to form an emulsion or microemulsion.

In some embodiments, the one or more surfactants is a surfactant described in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014, herein incorporated by reference. In some embodiments, the surfactant is a surfactant described in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014, and granted on Feb. 26, 2004 as U.S. Pat. No. 9,884,988 herein incorporated by reference.

In some embodiments, the emulsion or microemulsion comprises from about 1 wt % to about 50 wt %, or from about 1 wt % to about 40 wt %, or from about 1 wt % to about 35 wt %, or from about 5 wt % to about 40 wt %, or from about 5 wt % to about 35 wt %, or from about 10 wt % to about 30 wt %, or from about 10 wt % to about 20 wt % of the surfactant versus the total weight of the emulsion or microemulsion.

In some embodiments, the surfactants described herein in conjunction with solvents, generally form emulsions or microemulsions that may be diluted to a use concentration to form an oil-in-water nanodroplet dispersion. In some embodiments, the surfactants generally have hydrophile-lipophile balance (HLB) values from 8 to 18, or from 8 to 14.

Suitable surfactants for use with the compositions and methods are generally described herein. In some embodiments, the surfactant comprises a hydrophilic hydrocarbon surfactant.

In some embodiments, the surfactant comprises a nonionic surfactant. In some embodiments, the surfactant is a nonionic alkoxylated aliphatic alcohol having from 3 to 40 ethylene oxide (EO) units and from 0 to 20 propylene oxide (PO) units. The term aliphatic alcohol generally refers to a branched or linear, saturated or unsaturated aliphatic moiety having from 6 to 18 carbon atoms. In some embodiments, the surfactant is a nonionic alkoxylated aliphatic alcohol having from 3 to 40 ethylene oxide (EO) units.

In some embodiments, the hydrophilic hydrocarbon surfactant comprises an alcohol ethoxylate, wherein the alcohol ethoxylate contains a hydrocarbon group of 10 to 18 carbon atoms and contains an ethoxylate group of 5 to 12 ethylene oxide units.

In some embodiments, the surfactant is selected from the group consisting of ethoxylated fatty acids, ethoxylated fatty amines, and ethoxylated fatty amides wherein the fatty portion is a branched or linear, saturated or unsaturated aliphatic hydrocarbon moiety having from 6 to 18 carbon atoms.

In some embodiments, the surfactant is an alkoxylated castor oil. In some embodiments, the surfactant is a sorbitan ester derivative. In some embodiments the surfactant is an ethylene oxide—propylene oxide copolymer wherein the total number of EO and PO units is from 8 to 40 units. In some embodiments, the surfactant is an alkoxylated tristyryl phenol containing from 6 to 100 total ethylene oxide (EO) and propylene oxide (PO) units.

In some embodiments, the surfactant is an amine-based surfactant selected from the group consisting of ethoxylated alkylene amines, ethoxylated alkyl amines, propoxylated alkylene amines, propoxylated alkyl amines, ethoxylated-propoxylated alkylene amines and ethoxylated propoxylated alkyl amines. The ethoxylated/propoxylated alkylene or alkyl amine surfactant component preferably includes more than one nitrogen atom per molecule. Suitable amines include ethylenediaminealkoxylate and diethylenetriaminealkoxylate.

In some embodiments, the surfactant includes an alkanolamide surfactant. In some embodiments, the surfactant includes an alkanolamide surfactant that is a ($C_6$-$C_{18}$) aliphatic amide having groups $R^1$ and $R^2$ substituted on the amide nitrogen, wherein $R^1$ and $R^2$ are each independently selected from the group consisting of —H, —($C_1$-$C_{18}$) aliphatic hydrocarbon, —($C_2H_4O)_nH$, —($C_3H_6O)_nH$, —($C_2H_4O)_n(C_3H_6O)_mH$, and ($C_1$-$C_{18}$) aliphatic alcohol, and n is about 1 to about 50 and m is 0 to about 20, wherein at least one of $R^1$ and $R^2$ is —($C_2H_4O)_nH$, —($C_3H_6O)_nH$, —($C_2H4O)_n(C_3H_6O)_mH$, or ($C_1$-$C_{18}$) aliphatic alcohol, and n is about 1 to about 50 and m is 0 to about 20.

In some embodiments, the surfactant includes N,N-bis(hydroxyethyl)coco amides, N,N-bis(hydroxyethyl)coco fatty acid amides, cocamide DEA, cocamide diethanolamine, coco diethanolamides, coco diethanolamine, coco fatty acid diethanolamides, coconut DEA, coconut diethanolamides, coconut oil diethanolamides, coconut oil diethanolamine, lauric diethanolamide, or lauramide DEA. In some embodiments the surfactant includes an alkoxylated cocamide DEA, alkoxyated lauramide DEA, ethoxylated cocamide DEA, or ethoxylated lauramide DEA.

The alkanolamide surfactant can have the structure:

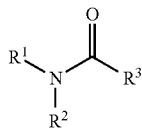

wherein $R^3$ is a $C_6$-$C_{18}$ aliphatic hydrocarbon group, and wherein $R^1$ and $R^2$ are each independently selected from the group consisting of —H, —($C_1$-$C_{18}$) aliphatic hydrocarbon, —($C_2H_4O)_n$H, —($C_3H_6O)_n$H, —($C_2H_4O)_n(C_3H_6O)_m$H, and n is about 1 to about 50 and m is 0 to about 20, wherein at least one of $R^1$ and $R^2$ is —($C_2H_4O)_n$H, —($C_3H_6O)_n$H, —($C_2H_4O)_n(C_3H_6O)_m$H, or ($C_1$-$C_{18}$) aliphatic alcohol, and n is about 1 to about 50 and m is 0 to about 20.

In some embodiments the surfactant is an alkoxylated polyimine with a relative solubility number (RSN) in the range of 5-20. As will be known to those of ordinary skill in the art, RSN values are generally determined by titrating water into a solution of surfactant in 1,4 dioxane. The RSN values is generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5000 daltons. The block copolymer may have a hydrophobic block that is comprised of a polymer chain that is linear, branched, hyperbranched, dendritic or cyclic.

In some embodiments, the surfactant is an aliphatic polyglycoside having the following formula:

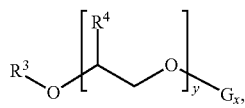

wherein $R^3$ is an aliphatic group having from 6 to 18 carbon atoms; each $R^4$ is independently selected from H, —$CH_3$, or —$CH_2CH_3$; Y is an average number of from about 0 to about 5; and X is an average degree of polymerization (DP) of from about 1 to about 4; G is the residue of a reducing saccharide, for example, a glucose residue. In some embodiments, Y is zero.

In some embodiments, the surfactant is an aliphatic glycamide having the following formula:

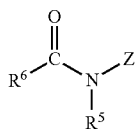

wherein $R^6$ is an aliphatic group having from 6 to 18 carbon atoms; $R^5$ is an alkyl group having from 1 to 6 carbon atoms; and Z is —$CH_2(CH_2OH)_b CH_2OH$, wherein b is from 3 to 5. In some embodiments, $R^5$ is —$CH_3$. In some embodiments, $R^6$ is an alkyl group having from 6 to 18 carbon atoms. In some embodiments, b is 3. In some embodiments, b is 4. In some embodiments, b is 5.

Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, dialkyl sulphosuccinates alkyl ether sulfates, linear and branched ether sulfates, fatty carboxylates, alkyl sarcosinates, alkyl phosphates and combinations thereof.

In some embodiments, the surfactant is an aliphatic sulfate wherein the aliphatic moiety is a branched or linear, saturated or unsaturated aliphatic hydrocarbon moiety having from 6 to 18 carbon atoms. In some embodiments, the surfactant is an aliphatic sulfonate wherein the aliphatic moiety is a branched or linear, saturated or unsaturated aliphatic hydrocarbon moiety having from 6 to 18 carbon atoms.

In some embodiments, the surfactant is an aliphatic alkoxy sulfate wherein the aliphatic moiety is a branched or linear, saturated or unsaturated aliphatic hydrocarbon moiety having from 6 to 18 carbon atoms and from 4 to 40 total ethylene oxide (EO) and propylene oxide (PO) units.

In some embodiments, the surfactant is an aliphatic-aromatic sulfate wherein the aliphatic moiety is a branched or linear, saturated or unsaturated aliphatic hydrocarbon moiety having from 6 to 18 carbon atoms. In some embodiments, the surfactant is an aliphatic-aromatic sulfonate wherein the aliphatic moiety is a branched or linear, saturated or unsaturated aliphatic hydrocarbon moiety having from 6 to 18 carbon atoms.

In some embodiments, the surfactant is an ester or half ester of sulfosuccinic acid with monohydric alcohols.

In some embodiments, the surfactant is a quaternary alkylammonium salt or a quaternary alkylbenzylammonium salt, whose alkyl groups have 1 to 24 carbon atoms (e.g., a halide, sulfate, phosphate, acetate, or hydroxide salt). In some embodiments, the surfactant is a quaternary alkylbenzylammonium salt, whose alkyl groups have 1-24 carbon atoms (e.g., a halide, sulfate, phosphate, acetate, or hydroxide salt). In In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt).

In some embodiments, the surfactant is a cationic surfactant such as, monoalkyl quaternary amines, such as cocotrimethylammonium chloride, cetyltrimethylammonium chloride, stearyltrimethylannnonium chloride, soyatrimethylannnonium chloride, behentrimethylammonium chloride, and the like and mixtures thereof. Other suitable cationic surfactants that may be useful include, but are not necessarily limited to, dialkylquaternary amines such as dicetyldimethylammonium chloride, dicocodimethylannnonium chloride, distearyldimethylammonium chloride, and the like and mixtures thereof.

In some embodiments, the surfactant is an amine oxide (e.g., dodecyldimethylamine oxide, lauramine oxide, laurylamidopropylamine oxide, cocamidopropylamine oxide). In some embodiments, the surfactant is amphoteric or zwitterionic, including sultaines (e.g., cocamidopropyl hydroxysultaine, lauryl sultaine, lauryl sulfobetaine, coco sultaine, coco sulfobetaine), betaines (e.g., cocamidopropyl betaine, lauramidopropyl betaine,or lauryl betaine, coco betaine), or phosphates (e.g., lecithin).

Non-limiting examples of suitable surfactants include nonionic surfactants with linear or branched structure, including, but not limited to, alkoxylated alcohols, alkoxylated fatty alcohols, alkoxylated castor oils, alkoxylated fatty acids, and alkoxylated fatty amides with a hydrocarbon chain of at least 8 carbon atoms and 5 units or more of alkoxylation. The term alkoxylation includes ethoxylation and propoxylation. Other nonionic surfactants include alkyl glycosides and alkyl glucamides. Additional surfactants are described herein. Other non-limiting examples of surfactants include adsorption modifiers, foamers, surface tension lowering enhancers, and emulsion breaking additives. Specific examples of such surfactants include cationic surfactants with a medium chain length, linear or branched anionic surfactants, alkyl benzene anionic surfactants, amine oxides, amphoteric surfactants, silicone based surfactants, alkoxylated novolac resins (e.g. alkoxylated phenolic resins), alkoxylated polyimines, alkoxylated polyamines, and fluorosurfactants. In some embodiments, the surfactant is a nonionic surfactant. In certain embodiments, the nonionic surfactant may be one or more of an ethoxylated castor oil, an ethoxylated alcohol, an ethoxylated tristyrylphenol, or an ethoxylated sorbitan ester, or combinations thereof.

Co-solvent

In some embodiments, an emulsion or microemulsion further comprises at least one co-solvent. The co-solvent may serve as a coupling agent between the one or more types of solvent and the surfactant and/or may aid in the stabilization of the emulsion or microemulsion. In some embodiments, the co-solvent is an alcohol. The alcohol may also be a freezing point depression agent for the emulsion or microemulsion. That is, the alcohol may lower the freezing point of the emulsion or microemulsion. In some embodiments, the alcohol is selected from primary, secondary, and tertiary alcohols having from 1 to 6 carbon atoms.

In some embodiments, the emulsion or microemulsion comprises a first type of co-solvent and second type of co-solvent. In some embodiments, the first type of co-solvent is a small chain alcohol (e.g., $C_{1-6}$ alcohol such as isopropanol). In some embodiments, the second type of co-solvent is an small chain alkylene glycol (e.g., $C_{1-7}$ alkylene glycol such as propylene glycol).

Non-limiting examples of co-solvents include methanol, ethanol, isopropanol, n-propanol, n-butanol, i-butanol, sec-butanol, iso-butanol, t-butanol, ethylene glycol, propylene glycol, dipropylene glycol monomethyl ether, triethylene glycol, and ethylene glycol monobutyl ether.

In some embodiments, the emulsion or microemulsion comprises from about 1 wt % to about 50 wt %, or from about 1 wt % to about 40 wt %, or from about 1 wt % to about 35 wt %, or from about 5 wt % to about 40 wt %, or from about 5 wt % to about 35 wt %, or from about 10 wt % to about 30 wt % of the co-solvent (e.g., alcohol), versus the total weight of the emulsion or microemulsion composition.

In some embodiments, the emulsion or microemulsion comprises from about 1 wt % and about 5 wt %, or from about 1 wt % and about 3 wt %, or about 2 wt % of the first type of co-solvent (e.g., $C_{1-6}$ alcohol such as isopropanol) and from about 15 wt % and about 25 wt %, or from about 17 wt % and about 22 wt % of the second type of co-solvent (e.g., $C_{1-7}$ alkylene glycol such as propylene glycol).

Additives

In some embodiments, the emulsion or microemulsion may comprise one or more additives in addition to the components discussed above. In some embodiments, the one or more additional additives are present in an amount from about 0 wt % to about 70 wt %, or from about 1 wt % to about 40 wt %, or from about 0 wt % to about 30 wt %, or from about 0.5 wt % to about 30 wt %, or from about 1 wt % to about 30 wt %, or from about 0 wt % to about 25 wt %, or from about 1 wt % to about 25 wt %, or from about 0 wt % to about 20 wt %, or from about 1 wt % to about 20 wt %, or from about 3 wt % to about 20 wt %, or from about 8 wt % to about 16 wt %, versus the total weight of the emulsion or microemulsion composition.

Non-limiting examples of additives include a demulsifier, a freezing point depression agent, a proppant, a scale inhibitor, a friction reducer, a biocide, a corrosion inhibitor, a buffer, a viscosifier, an oxygen scavenger, a clay control additive, a paraffin control additive, an asphaltene control additive, an acid, an acid precursor, or a salt.

In some embodiments, the additive is a demulsifier. The demulsifier may aid in preventing the formulation of an emulsion between a treatment fluid and crude oil. Non-limiting examples of demulsifiers include polyoxyethylene (50) sorbitol hexaoleate. In some embodiments, the demulsifier is present in the emulsion or microemulsion in an amount from about 4 wt % to about 8 wt % versus the total weight of the emulsion or microemulsion composition.

In some embodiments, the emulsion or the microemulsion comprises a freezing point depression agent (e.g., propylene glycol). The emulsion or the microemulsion may comprise a single freezing point depression agent or a combination of two or more freezing point depression agents. The term "freezing point depression agent" is given its ordinary meaning in the art and refers to a compound which is added to a solution to reduce the freezing point of the solution. That is, in some embodiments, a solution comprising the freezing point depression agent has a lower freezing point as compared to an essentially identical solution not comprising the freezing point depression agent. Those of ordinary skill in the art will be aware of suitable freezing point depression agents for use in the emulsions or the microemulsions described herein. Non-limiting examples of freezing point depression agents include primary, secondary, and tertiary alcohols with from 1 to 20 carbon atoms and alkylene glycols. In some embodiments, the alcohol comprises at least 2 carbon atoms. Non-limiting examples of alcohols include methanol, ethanol, i-propanol, n-propanol, t-butanol, n-butanol, n-pentanol, n-hexanol, and 2-ethyl hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycylic acid salt. Another non-limiting example of a freezing point depression agent is a combination of choline chloride and urea. In some embodiments, the emulsion or microemulsion comprising the freezing point depression agent is stable over a wide range of temperatures, e.g., from about 50° F. to 200° F. In some embodiments a freezing point depression agent is present in the emulsion or microemulsion in an amount from about 10 wt % to about 15 wt %.

In some embodiments, the emulsion or the microemulsion comprises a proppant. In some embodiments, the proppant acts to hold induced hydraulic fractures open in an oil and/or gas well. Non-limiting examples of proppants (e.g., propping agents) include grains of sand, glass beads, crystalline silica (e.g., quartz), hexamethylenetetramine, ceramic proppants (e.g., calcined clays), resin coated sands, and resin coated ceramic proppants. Other proppants are also possible and will be known to those skilled in the art.

In some embodiments, the emulsion or the microemulsion comprises a scale inhibitor. The scale inhibitor may slow scaling in, e.g., the treatment of an oil and/or gas well, wherein scaling involves the unwanted deposition of solids (e.g., along a pipeline) that hinders fluid flow. Non-limiting examples of scale inhibitors include one or more of methyl alcohol, organic phosphonic acid salts (e.g., phosphonate salt, aminopolycarboxlic acid salts), polyacrylate, ethane-1, 2-diol, calcium chloride, and sodium hydroxide. Other scale inhibitors are also possible and will be known to those skilled in the art.

In some embodiments, the emulsion or the microemulsion comprises a friction reducer. The friction reducer may reduce drag, which reduces energy input required in the context of e.g. delivering the emulsion or microemulsion into a wellbore. Non-limiting examples of friction reducers include oil-external emulsions of polymers with oil-based solvents and an emulsion-stabilizing surfactant. The emulsions may include natural-based polymers like guar, cellulose, xanthan, proteins, polypeptides or derivatives of same or synthetic polymers like polyacrylamide-co-acrylic acid (PAM-AA), polyethylene oxide, polyacrylic acid, and other copolymers of acrylamide and other vinyl monomers. For a list of non-limiting examples, see U.S. Pat. No. 8,865,632, filed Nov. 10, 2008, entitled "DRAG-REDUCING COPOLYMER COMPOSITION," herein incorporated by reference. Other common drag-reducing additives include dispersions of natural- or synthetic polymers and copolymers in saline solution and dry natural- or synthetic polymers and copolymers. These polymers or copolymers may be non-ionic, zwitterionic, anionic, or cationic depending on the composition of polymer and pH of solution. Other non-limiting examples of friction reducers include petroleum distillates, ammonium salts, polyethoxylated alcohol surfactants, and anionic polyacrylamide copolymers. Other friction reducers are also possible and will be known to those skilled in the art.

In some embodiments, the emulsion or the microemulsion comprises a biocide. The biocide may kill unwanted organisms (e.g., microorganisms) that come into contact with the emulsion or microemulsion. Non-limiting examples of biocides include didecyl dimethyl ammonium chloride, gluteral, Dazomet, bronopol, tributyl tetradecyl phosphonium chloride, tetrakis (hydroxymethyl) phosphonium sulfate, AQUCAR®, UCARCIDE®, glutaraldehyde, sodium hypochlorite, and sodium hydroxide. Other biocides are also possible and will be known to those skilled in the art.

In some embodiments, the emulsion or the microemulsion comprises a corrosion inhibitor. The corrosion inhibitor may reduce corrosion during e.g. treatment of an oil and/or gas well (e.g., in a metal pipeline). Non-limiting examples of corrosion inhibitors include isopropanol, quaternary ammonium compounds, thiourea/formaldehyde copolymers, propargyl alcohol, and methanol. Other corrosion inhibitors are also possible and will be known to those skilled in the art.

In some embodiments, the emulsion or the microemulsion comprises a buffer. The buffer may maintain the pH and/or reduce changes in the pH of the aqueous phase of the emulsion or the microemulsion. Non-limiting examples of buffers include acetic acid, acetic anhydride, potassium hydroxide, sodium hydroxide, and sodium acetate. Other buffers are also possible and will be known to those skilled in the art.

In some embodiments, the emulsion or the microemulsion comprises a viscosifier. The viscosifier may increase the viscosity of the emulsion or the microemulsion. Non-limiting examples of viscosifiers include polymers, e.g., guar, cellulose, xanthan, proteins, polypeptides or derivatives of same or synthetic polymers like polyacrylamide-co-acrylic acid (PAM-AA), polyethylene oxide, polyacrylic acid, and other copolymers of acrylamide and other vinyl monomers. Other viscosifiers are also possible and will be known to those skilled in the art.

In some embodiments, the emulsion or the microemulsion comprises an oxygen scavenger. The oxygen scavenger may decrease the level of oxygen in the emulsion or the microemulsion. Non-limiting examples of oxygen scavengers include sulfites and bisulfites. Other oxygen scavengers are also possible and will be known to those skilled in the art.

In some embodiments, the emulsion or the microemulsion comprises a clay control additive. The clay control additive may minimize damaging effects of clay (e.g., swelling, migration), e.g., during treatment of oil and/or gas wells. Non-limiting examples of clay control additives include quaternary ammonium chloride, tetramethylammonium chloride, polymers (e.g., polyanionic cellulose (PAC), partially hydrolyzed polyacrylamide (PHPA), etc.), glycols, sulfonated asphalt, lignite, sodium silicate, and choline chloride. Other clay control additives are also possible and will be known to those skilled in the art.

In some embodiments, the emulsion or the microemulsion comprises a paraffin control additive and/or an asphaltene control additive. The paraffin control additive or the asphaltene control additive may minimize paraffin deposition or asphaltene precipitation respectively in crude oil, e.g., during treatment of oil and/or gas wells. Non-limiting examples of paraffin control additives and asphaltene control additives include active acidic copolymers, active alkylated polyester, active alkylated polyester amides, active alkylated polyester imides, aromatic naphthas, and active amine sulfonates. Other paraffin control additives and asphaltene control additives are also possible and will be known to those skilled in the art.

In some embodiments, the emulsion or the microemulsion comprises an acid and/or an acid precursor (e.g., an ester). For example, the emulsion or the microemulsion may comprise an acid when used during acidizing operations. In some embodiments, the surfactant is alkaline and an acid (e.g., hydrochloric acid) may be used to adjust the pH of the emulsion or the microemulsion towards neutral. Non-limiting examples of acids or di-acids include hydrochloric acid, acetic acid, formic acid, succinic acid, maleic acid, malic acid, lactic acid, and hydrochloric-hydrofluoric acids. In some embodiments, the emulsion or the microemulsion comprises an organic acid or organic di-acid in the ester (or di-ester) form, whereby the ester (or diester) is hydrolyzed in the wellbore and/or reservoir to form the parent organic acid and an alcohol in the wellbore and/or reservoir. Non-limiting examples of esters or di-esters include isomers of methyl formate, ethyl formate, ethylene glycol diformate, alpha,alpha-4-trimethyl-3-cyclohexene-1-methylformate, methyl lactate, ethyl lactate, alpha,alpha-4-trimethyl 3-cyclohexene-1-methyllactate, ethylene glycol dilactate, ethylene glycol diacetate, methyl acetate, ethyl acetate, alpha, alpha,-4-trimethyl-3-cyclohexene-1-methylacetate, dimethyl succinate, dimethyl maleate, di(alpha,alpha-4-trimethyl-3-cyclohexene-1-methyl)-succinate, 1-methyl-4-(1-methylethenyl)-cyclohexylformate, 1-methyl-4-(1-ethylethenyl)-cyclohexylactate, 1-methyl-4-(1-methylethenyl)-cyclohexylacetate, and di(1-methy-4-(1-methylethenyl) cyclohexyl)-succinate. Other acids are also possible and will be known to those skilled in the art.

In some embodiments, the emulsion or the microemulsion comprises a salt. The salt may reduce the amount of water needed as a carrier fluid and/or may lower the freezing point of the emulsion or the microemulsion. Non limiting examples of salts include salts comprising K, Na, Br, Cr, Cs, or Li, e.g., halides of these metals, including but not limited to NaCl, KCl, $CaCl_2$, and $MgCl_2$. Other salts are also possible and will be known to those skilled in the art.

In some embodiments, the emulsion or the microemulsion comprises an additive as described in U.S. patent application Ser. No. 15/457,792, filed Mar. 13, 2017, entitled "METHODS AND COMPOSITIONS INCORPORATING ALKYL POLYGLYCOSIDE SURFACTANT FOR USE IN OIL AND/OR GAS WELLS," published as US 2017-0275518 on Sep. 28, 2017, herein incorporated by reference.

Methods

The emulsions or microemulsions described herein may be formed using methods known to those of ordinary skill in the art. In some embodiments, the aqueous and non-aqueous phases may be combined (e.g., the water and the solvent(s)), followed by addition of a surfactant(s) and optionally a co-solvent(s) (e.g., alcohol(s)) and agitation). Other orders of addition/combining are possible. The strength, type, and length of the agitation may be varied as known in the art depending on various factors including the components of the emulsion or microemulsion, the quantity of the emulsion or microemulsion, and the resulting type of emulsion or microemulsion formed. For example, for small samples, a few seconds of gentle mixing can yield an emulsion or microemulsion, whereas for larger samples, longer agitation times and/or stronger agitation may be required. Agitation may be provided by any suitable source, e.g., a vortex mixer, a stirrer (e.g., magnetic stirrer), etc.

Any suitable method for injecting the emulsion or microemulsion (e.g., a diluted emulsion or microemulsion) into a wellbore may be employed. For example, in some embodiments, the emulsion or microemulsion, optionally diluted, may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the emulsion or microemulsion for a suitable period of time. The emulsion or microemulsion and/or other fluids may be removed from the well using known techniques, including producing the well.

It should be understood, that in embodiments where an emulsion or microemulsion is said to be injected into a wellbore, that the emulsion or microemulsion may be diluted and/or combined with other liquid component(s) prior to and/or during injection (e.g., via straight tubing, via coiled tubing, etc.). For example, in some embodiments, the emulsion or microemulsion is diluted with an aqueous carrier fluid (e.g., water, brine, sea water, fresh water, or a well-treatment fluid (e.g., an acid, a fracturing fluid comprising polymers, produced water, sand, slickwater, etc.,)) prior to and/or during injection into the wellbore. In some embodiments, a composition for injecting into a wellbore is provided comprising an emulsion or microemulsion as described herein and an aqueous carrier fluid, wherein the emulsion or microemulsion is present in an amount from about 0.1 gallons per thousand gallons (gpt) per dilution fluid to about 50 gpt, or from about 0.1 gpt to about 100 gpt, or from about 0.5 gpt to about 10 gpt, or from about 0.5 gpt to about 2 gpt.

The emulsions and microemulsions described herein may be used in various aspects (e.g. steps) of the life cycle of an oil and/or gas well, including, but not limited to, drilling, mud displacement, casing, cementing, perforating, stimulation, kill fluids, enhanced oil recovery, improved oil recovery, stored fluid, and offshore applications. Inclusion of an emulsion or microemulsion into the fluids typically employed in these processes, e.g., drilling fluids, mud displacement fluids, casing fluids, cementing fluids, perforating fluid, stimulation fluids, kill fluids, etc., may result in many advantages as compared to use of the fluid alone.

Various aspects of the well life cycle are described in detail in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014 and in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014, each herein incorporated by reference.

As will be understood by those of ordinary skill in the art, the steps of the life cycle of an oil and/or gas well may be carried out in a variety of orders. In addition, in some embodiments, each step may occur more than once in the life cycle of the well.

Definitions

For convenience, certain terms employed in the specification, examples, and appended claims are listed here.

As used herein, the term emulsion is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term microemulsion is given its ordinary meaning in the art and refers to dispersions of one immiscible liquid in another, in the form of droplets, with diameters approximately in the range of about from about 1 nanometers (nm) to about 1000 nm, or from about 10 nm to about 1000 nm, or from about 10 nm to about 500 nm, or from about 10 nm to about 300 nm, or from about 10 nm to about 100 nm.

In some embodiments, microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, the microemulsions described herein are stabilized microemulsions that are formed by the combination of a solvent-surfactant blend with an appropriate oil-based or water-based carrier fluid. Generally, the microemulsion forms upon simple mixing of the components without the need for high shearing generally required in the formation of ordinary emulsions. In some embodiments, the microemulsion is a thermodynamically stable system, and the droplets remain finely dispersed over time. In some embodiments, the average droplet size ranges from about 10 nm to about 300 nm.

It should be understood that the description herein which focuses on microemulsions is by no means limiting, and emulsions may be employed where appropriate.

In some embodiments, the emulsion or microemulsion is a single emulsion or microemulsion. For example, the emulsion or microemulsion comprises a single layer of a surfactant. In other embodiments, the emulsion or microemulsion may be a double or multilamellar emulsion or microemulsion. For example, the emulsion or microemulsion comprises two or more layers of a surfactant. In some embodiments, the emulsion or microemulsion comprises a single layer of surfactant surrounding a core (e.g., one or more of water, oil, solvent, and/or other additives) or a multiple layers of surfactant (e.g., two or more concentric layers surrounding the core). In certain embodiments, the emulsion or microemulsion comprises two or more immiscible cores (e.g., one or more of water, oil, solvent, and/or other additives which have equal or about equal affinities for the surfactant).

The term "emulsion" is given its ordinary meaning in the art and generally refers to a thermodynamically stable dispersion of water-in-oil or oil-in-water wherein in some embodiments (e.g., in the case of a macroemulsion) the interior phase is in the form of visually discernable droplets and the overall emulsion is cloudy, and wherein the droplet diameter may in some embodiments (e.g., in the case of a macroemulsion) be greater than about 300 nm.

The term "microemulsion" is given its ordinary meaning in the art and generally refers to a thermodynamically stable dispersion of water and oil that forms spontaneously upon mixture of oil, water and various surfactants. Microemulsion droplets generally have a mean diameter of less than 300 nm. Because microemulsion droplets are smaller than the wavelength of visible light, solutions comprising them are generally translucent or transparent, unless there are other components present that interfere with passage of visible light. In some embodiments, a microemulsion is substantially homogeneous. In other embodiments, microemulsion particles may co-exist with other surfactant-mediated systems, e.g., micelles, hydrosols, and/or macroemulsions. In some embodiments, the microemulsions of the present invention are oil-in-water microemulsions. In some embodiments, the majority of the oil component, e.g., (in various embodiments, greater than about 50%, greater than about 75%, or greater than about 90%), is located in microemulsion droplets rather than in micelles or macroemulsion droplets. In various embodiments, the microemulsions of the invention are clear or substantially clear.

The conventional terms water-in-oil and oil-in-water, whether referring to macroemulsions, emulsions, or microemulsions, simply describe systems that are water-discontinuous and water-continuous, respectively. They do not denote any additional restrictions on the range of substances denoted as "oil".

The terms "clear" or "transparent" as applied to a microemulsion are given its ordinary meaning in the art and generally refers to the microemulsion appearing as a single phase without any particulate or colloidal material or a second phase being present when viewed by the naked eye.

Definitions of specific functional groups and chemical terms are described in more detail below. For purposes of this invention, the chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1 to 20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight chain alkyl groups, branched-chain alkyl groups, cycloalkyl (alicyclic) groups, alkyl substituted cycloalkyl groups, and cycloalkyl substituted alkyl groups. In some embodiments, the alkyl group may be a lower alkyl group, e.g., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some embodiments, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer Likewise, cycloalkyls may have from 3 to 10 carbon atoms in their ring structure, or 5, 6 or 7 carbon atoms in their ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1 to 20 aliphatic carbon atoms. In certain other embodiments, the alkyl, alkenyl, and alkynyl groups employed in the invention contain 1 to 10 aliphatic carbon atoms. In yet other embodiments, the alkyl, alkenyl, and alkynyl groups employed in the invention contain 1 to 8 aliphatic carbon atoms. In still other embodiments, the alkyl, alkenyl, and alkynyl groups employed in the invention contain 1 to 6 aliphatic carbon atoms. In yet other embodiments, the alkyl, alkenyl, and alkynyl groups employed in the invention contain 1 to 4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or hetercyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —C(O)$R^x$; —$CO_2(R^x)$; —CON($R^x$)$_2$; —OC(O)$R^x$; —$OCO_2R^x$; —OCON($R^x$)$_2$; —N($R^x$)$_2$; —S(O)$_2R^x$; —N$R^x$(CO)$R^x$, wherein each occurrence of $R^x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the examples that are described herein.

As used herein, the term "aromatic" is given its ordinary meaning in the art and refers to aromatic carbocyclic groups, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The term aromatic excompasses aryl and heteroaryl.

As used herein, the term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, e.g., the substituents recited for aliphatic moieties, or for other moieties as disclosed herein, resulting in the formation of a stable compound. In some embodiments, an aryl group is a stable monocyclic or polycyclic unsaturated moiety having preferably 3 to 14 carbon atoms, each of which may be substituted or unsubstituted.

The term "heterocycle" is given its ordinary meaning in the art and refers to cyclic groups containing at least one heteroatom as a ring atom, in some embodiments, 1 to 3 heteroatoms as ring atoms, with the remainder of the ring atoms being carbon atoms. Suitable heteroatoms include oxygen, sulfur, nitrogen, phosphorus, and the like. In some embodiments, the heterocycle may be 3-membered to 10-membered ring structures or 3-membered to 7-membered rings, whose ring structures include one to four heteroatoms.

The term "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3 to 14 carbon atoms, each of which may be substituted or unsubstituted. Substituents include, but are not limited to, any of the previously mentioned substituents, e.g., the substituents recited for aliphatic moieties, or for other moieties as disclosed herein, resulting in the formation of a stable compound. In some embodiments, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, e.g., pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some embodiments, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor.

The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

EXAMPLES

These and other aspects of the present invention will be further appreciated upon consideration of the following Examples, which are intended to illustrate certain particular embodiments of the invention but are not intended to limit its scope, as defined by the claims.

Example 1

As set forth in Table 1 below, a series of laboratory experiments (Experiment #1 through #8) were conducted to observed whether a microemulsion forms at 25° C., when using long chain solvents, namely aliphatic mineral spirts having 12-18 carbon atoms, in combination with oxygenated solvents (e.g. isooctanol). Samples were prepared by mixing 16 wt % ethoxylated nonionic surfactant with each of the other components as set forth in Table 7, and then balanced to 100 wt % water. Each sample was characterized as a microemulsion if upon minimal amounts of low-shear mixing, the sample formed a visually clear, homogenous, stable, single phase at 25° C.

TABLE 1

Long Chain Aliphatic Mineral Spirits with Oxygenated Solvent (Isooctanol)

| Experiment # | Isopropanol (wt %) | Aliphatic Mineral Spirits ($C_{12}$-$C_{18}$ blend) (wt %) | Isooctanol (wt %) | Propylene Glycol (wt %) | Microemulsion Formed at 25° C. |
|---|---|---|---|---|---|
| 1 | 2.0 | 2.2 | 2.8 | 18.0 | No |
| 2 | 2.0 | 2.2 | 2.3 | 18.5 | No |
| 3 | 2.0 | 2.2 | 1.8 | 19.0 | Yes |
| 4 | 2.0 | 2.2 | 0.8 | 20 | No |
| 5 | 2.5 | 1.6 | 1.6 | 18.7 | Yes |
| 6 | 2.5 | 2.2 | 1.6 | 18.7 | Yes |
| 7 | 2.5 | 0 | 1.6 | 20.9 | No |
| 8 | 2.5 | 2.2 | 0 | 20.3 | No |

In Experiment #2, no microemulsion was formed at 25° C. when using a combination of 2.2 wt % aliphatic mineral spirits and 2.3 wt % isooctanol. However, as shown in Experiment #3, by using 2.2 wt % aliphatic mineral spirits and decreasing the isooctanol to 1.8 wt.%, a microemulsion was formed at 25° C. Further, the microemulsion formed in Experiment #3 was determined to be stable for a wide temperature range of from about 15° F. (−9.4° C.) to about 125° F. (51.7° C.).

As discussed above in Experiment #3, a microemulsion was formed. However as shown in Experiment #4, which comprises 2.2 wt % aliphatic mineral spirts and 0.8 wt % oxygenated solvent (i.e. isooctanol), no microemulsion was formed.

Experiment #5, which comprises 1.6 wt % aliphatic mineral spirits and 1.6 wt % oxygenated solvent (i.e. isooctanol), a microemulsion formed. Further, the microemulsion formed in Experiment #5 was tested and determined to be stable for a wide temperature range of from about 15° F. (−9.4° C.) to about 125° F. (51.7° C.).

In Experiment #6, which comprises 2.2 wt % of aliphatic mineral spirits and 1.6 wt % oxygenated solvent (i.e. isooctanol), a microemulsion formed. Further, the microemulsion formed in Experiment #6 was tested and determined to be stable for a wide temperature range of from about 15° F. (−9.4° C.) to about 125° F. (51.7° C.). As is evidenced in Experiment #6, not just any ratio of aliphatic mineral spirit to oxygenated solvent will result in the formation of a microemulsion.

A person of ordinary skill in the art would not expect that a composition comprising a solvent having long chain lengths would form a microemulsion that is stable for a wide range of temperatures from about 15° F. (−9.4° C.) to about 125° F. (51.7° C.) as shown in Experiment #3, #5, and #6.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g. the inclusion of at least one, but also including more than one, of a number or list of elements, and, optionally, additional unlisted items. Only terms clearly indicated to the contrary, such as "only one of," or "exactly one of," or, when used in the claims, "consisting of," will refer to the inclusion of exactly one element or a list of elements. In general, the term "or" as used herein shall only be interpreted as indicating exclusive alternatives (e.g. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "between" in reference to a range of elements or a range of units should be understood to include the lower and upper range of the elements or the lower and upper range of the units, respectively. For example, the phrase describing a molecule having "between 6 to 12 carbon atoms" should mean a molecule that may have, e.g., from 6 carbon atoms to 12 carbon atoms, inclusively. For example, the phrase describing a composition comprising "between about 5 wt % and about 40 wt % surfactant" should mean the composition may have, e.g., from about 5 wt % to about 40 wt % surfactant, inclusively.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, e.g. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A microemulsion for treating an oil or gas well having a wellbore, comprising:
    a surfactant comprising ethoxylated tristyrylphenol;
    an aqueous phase; and
    a non-aqueous phase comprising a first type of solvent and a second type of solvent, wherein the first type of solvent is a long chain hydrocarbon solvent, and the second type of solvent is an oxygenated solvent.

2. The microemulsion of claim 1, wherein the ratio of the first type of solvent of solvent to the second type of solvent is between about 11:4 to about 1:1 or between about 5:1 to about 1:5 by weight.

3. The microemulsion of claim 1, wherein the first type of solvent comprises a $C_{12-22}$ hydrocarbon compound or a plurality of $C_{12-22}$ hydrocarbon compounds.

4. The microemulsion of claim 1, wherein the first type of solvent comprises a $C_{12-18}$ alpha-olefin solvent or a plurality of $C_{12-18}$ alpha-olefin solvents.

5. The microemulsion of claim 1, wherein the first type of solvent is present in an amount of about 1 wt % to about 20 wt % versus the total microemulsion.

6. The microemulsion of claim 1, wherein the second type of solvent is a $C_{6-18}$ alcohol or a plurality of $C_{6-18}$ alcohols.

7. The microemulsion of claim 1, wherein the second type of solvent is octanol or an isomer thereof.

8. The microemulsion of claim 1, wherein the second type of solvent is isooctanol.

9. The microemulsion of claim 1, wherein the second type of solvent is present in an amount of about 1 wt % to about 15 wt % versus the total microemulsion.

10. The microemulsion of claim 1, wherein the aqueous phase comprises water.

11. The microemulsion of claim 1, wherein the aqueous phase is present in an amount of about 5 wt % to about 75 wt % versus the total microemulsion.

12. The microemulsion of claim 1, wherein the surfactant is present in an amount of about 5 wt % to about 40 wt % versus the total microemulsion.

13. The microemulsion of claim 1, wherein the microemulsion is stable at temperatures from about −10° C. to about 55° C.

14. The microemulsion of claim 1, wherein the microemulsion further comprises at least one co-solvent.

15. The microemulsion of claim 14, wherein the co-solvent is a $C_{1-6}$ alcohol, a $C_{1-7}$ alkylene glycol, or a combination thereof.

16. The microemulsion of claim 1, wherein the microemulsion comprises from about 1 wt % to about 5 wt %, or from about 1 wt % to about 3 wt %, or about 2 wt % of a first type of co-solvent, versus the total microemulsion, wherein the first type of co-solvent is a $C_{1-6}$ alcohol.

17. The microemulsion of claim 16, wherein the $C_{1-6}$ alcohol is isopropanol.

18. The microemulsion of claim 1, wherein the microemulsion comprises from about 15 wt % to about 25 wt %, or from about 17 wt % to about 22 wt % of a second type of co-solvent, versus the total microemulsion, wherein the second type of co-solvent is $C_{1-7}$ alkylene glycol.

19. The microemulsion of claim 18, wherein the $C_{1-7}$ alkylene glycol is propylene glycol.

20. The microemulsion of claim 1, wherein the microemulsion comprises:
from about 10 wt % to about 20 wt % of the surfactant;
from about 30 wt % to about 69 wt % of the aqueous phase;
from about 5 wt % to about 20 wt % of the non-aqueous phase;
wherein the ratio of the first type of solvent to the second type of solvent is between about 11:4 to about 1:1, or between about 5:1 to about 1:5 by weight;
from about 1 wt % to about 5 wt % of a first type of co-solvent, wherein the first type of co-solvent is a $C_{1-6}$ alcohol; and
from about 15 wt % to about 25 wt % of second type of co-solvent, wherein the second type of co-solvent is $C_{1-7}$ alkylene glycol, versus the total microemulsion.

21. The microemulsion of claim 1, wherein the second type of solvent is isooctanol and is present in an amount of about 1 wt % to about 3 wt % versus the total microemulsion.

22. The microemulsion of claim 21, wherein the first type of solvent comprises a $C_{12-18}$ hydrocarbon solvent.

23. A method of treating an oil or gas well having a wellbore, comprising:
injecting the microemulsion of claim 1 into the wellbore of the oil or gas well to stimulate the production of hydrocarbons.

* * * * *